(12) United States Patent
Gordon

(10) Patent No.: US 11,820,450 B2
(45) Date of Patent: *Nov. 21, 2023

(54) UNIVERSAL AXLE-HUB ASSEMBLY

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,197

(22) Filed: Aug. 10, 2021

(65) Prior Publication Data

US 2021/0362783 A1 Nov. 25, 2021

Related U.S. Application Data

(63) Continuation of application No. 16/454,516, filed on Jun. 27, 2019, now Pat. No. 11,091,199, which is a (Continued)

(51) Int. Cl.
*B62D 7/22* (2006.01)
*B60G 7/00* (2006.01)
(Continued)

(52) U.S. Cl.
CPC .................. *B62D 7/22* (2013.01); *B60B 3/06* (2013.01); *B60B 27/0052* (2013.01);
(Continued)

(58) Field of Classification Search
CPC ........ B62D 7/22; B62D 23/005; B62D 21/11; B62D 7/16; B62D 21/12; B62D 3/02; B62D 27/023; B62D 7/20; B62D 7/18; B60K 17/16; B60K 17/306; F16C 11/0695; F16C 2326/24; B60B 35/128; B60B 27/0052; B60B 3/16; B60R 19/54; B60G 3/14; B60G 7/02; B60G 15/063; B60G 7/001; B60G 7/005; B60G 3/20; B60G 7/008;
(Continued)

(56) References Cited

U.S. PATENT DOCUMENTS 3,963,260 A * 6/1976 Inbody ...................... B62D 7/16
280/124.126
4,705,090 A * 11/1987 Bartos ............... B60C 23/00336
137/224
(Continued)

*Primary Examiner* — Drew J Brown
(74) *Attorney, Agent, or Firm* — Barry Choobin; Patent 360

(57) ABSTRACT

A universal axle-hub assembly is provided for an off-road vehicle. The universal axle-hub assembly comprises a wheel hub that receives a constant velocity (CV) axle snout into an opening extending through an axle support of the wheel hub. An outboard-most portion of the opening is a splined portion that engages with similar splines disposed on an outboard-most portion of the CV axle snout. An inboard-most portion of the opening is a smooth portion that receives a smooth portion of the CV axle snout. The axle support extends through an entirety of the width of a bearing that supports the wheel hub, such that the bearing supports the smooth portion of the CV axle snout and substantially eliminates shear forces acting on the splined portion of the CV axle snout. A bearing carrier supports the bearing and may be fastened onto a trailing arm or a spindle of the off-road vehicle.

15 Claims, 8 Drawing Sheets

Related U.S. Application Data continuation of application No. 15/625,728, filed on Jun. 16, 2017, now Pat. No. 10,343,716.

(60) Provisional application No. 62/480,960, filed on Apr. 3, 2017.

(51) Int. Cl.

| | | |
|---|---|---|
| *B60G 7/02* | (2006.01) | |
| *B60G 15/06* | (2006.01) | |
| *B62D 7/20* | (2006.01) | |
| *B60K 17/30* | (2006.01) | |
| *B60G 3/20* | (2006.01) | |
| *B62D 7/16* | (2006.01) | |
| *F16C 7/02* | (2006.01) | |
| *B62D 25/08* | (2006.01) | |
| *B62D 65/04* | (2006.01) | |
| *B62D 63/02* | (2006.01) | |
| *B60G 17/00* | (2006.01) | |
| *B62D 7/18* | (2006.01) | |
| *F16C 11/06* | (2006.01) | |
| *B60B 3/16* | (2006.01) | |
| *B60B 27/00* | (2006.01) | |
| *B60B 35/12* | (2006.01) | |
| *B60G 3/14* | (2006.01) | |
| *F16D 3/30* | (2006.01) | |
| *B60B 3/06* | (2006.01) | |
| *B60K 17/16* | (2006.01) | |
| *B60R 19/54* | (2006.01) | |
| *B62D 3/02* | (2006.01) | |
| *B62D 21/11* | (2006.01) | |
| *B62D 21/12* | (2006.01) | |
| *B62D 23/00* | (2006.01) | |
| *B62D 27/02* | (2006.01) | |
| *F16D 1/10* | (2006.01) | |

(52) U.S. Cl.
CPC .............. *B60B 35/128* (2013.01); *B60G 3/14* (2013.01); *B60G 3/20* (2013.01); *B60G 3/202* (2013.01); *B60G 7/001* (2013.01); *B60G 7/005* (2013.01); *B60G 7/008* (2013.01); *B60G 7/02* (2013.01); *B60G 15/063* (2013.01); *B60G 17/00* (2013.01); *B60K 17/16* (2013.01); *B60K 17/306* (2013.01); *B60R 19/54* (2013.01); *B62D 3/02* (2013.01); *B62D 7/16* (2013.01); *B62D 7/166* (2013.01); *B62D 7/18* (2013.01); *B62D 7/20* (2013.01); *B62D 21/11* (2013.01); *B62D 21/12* (2013.01); *B62D 23/005* (2013.01); *B62D 25/08* (2013.01); *B62D 27/023* (2013.01); *B62D 63/025* (2013.01); *B62D 65/04* (2013.01); *F16C 7/02* (2013.01); *F16C 11/0695* (2013.01); *F16D 3/30* (2013.01); *B60G 2200/14* (2013.01); *B60G 2200/144* (2013.01); *B60G 2200/156* (2013.01); *B60G 2200/44* (2013.01); *B60G 2202/312* (2013.01); *B60G 2204/129* (2013.01); *B60G 2204/143* (2013.01); *B60G 2204/148* (2013.01); *B60G 2204/30* (2013.01); *B60G 2204/416* (2013.01); *B60G 2204/62* (2013.01); *B60G 2206/11* (2013.01); *B60G 2206/12* (2013.01); *B60G 2206/50* (2013.01); *B60G 2206/72* (2013.01); *B60G 2206/73* (2013.01); *B60G 2206/84* (2013.01); *B60G 2300/07* (2013.01); *F16C 2326/24* (2013.01); *F16D 2001/103* (2013.01)

(58) Field of Classification Search
CPC ............ B60G 2200/14; B60G 2206/73; B60G 2200/44; B60G 2204/143; B60G 2206/84; B60G 2206/72; B60G 2200/144; B60G 2204/129; B60G 2206/12; B60G 2204/148; B60G 2300/07; B60G 2206/50; B60G 2200/156; B60G 2202/312; B60G 2206/11; B60G 2204/416; F16D 3/30; F16D 2001/103

See application file for complete search history.

(56) References Cited

U.S. PATENT DOCUMENTS

| | | | | |
|---|---|---|---|---|
| 6,485,188 | B1* | 11/2002 | Dougherty | ............ B60B 35/121 |
| | | | | 384/537 |
| 6,935,005 | B2* | 8/2005 | Avery | ..................... B60B 27/00 |
| | | | | 29/898.07 |
| 10,343,716 | B2* | 7/2019 | Gordon | ..................... B62D 7/20 |
| 2012/0031693 | A1* | 2/2012 | Deckard | ............... F16H 57/027 |
| | | | | 180/68.3 |
| 2014/0103627 | A1* | 4/2014 | Deckard | ................ B60G 3/202 |
| | | | | 411/362 |
| 2016/0347137 | A1* | 12/2016 | Despres-Nadeau | .... B60G 3/202 |
| 2018/0126782 | A1* | 5/2018 | Sinka | ..................... B60B 27/001 |

* cited by examiner

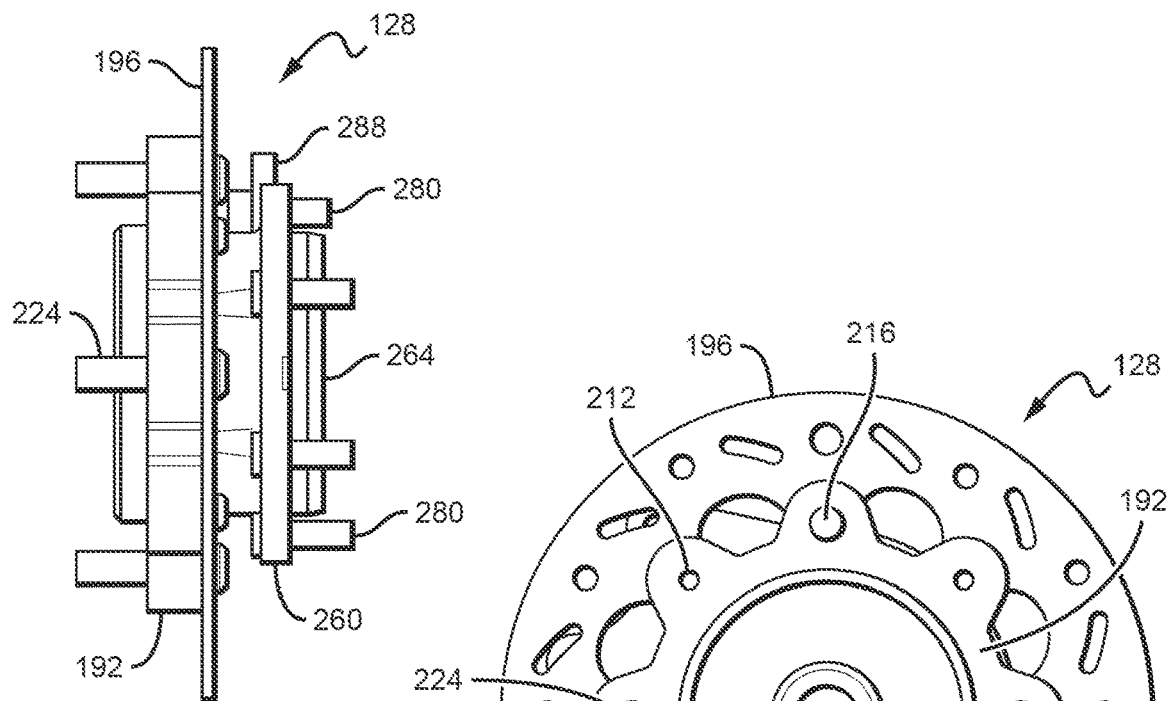
FIG. 6A
FIG. 6B
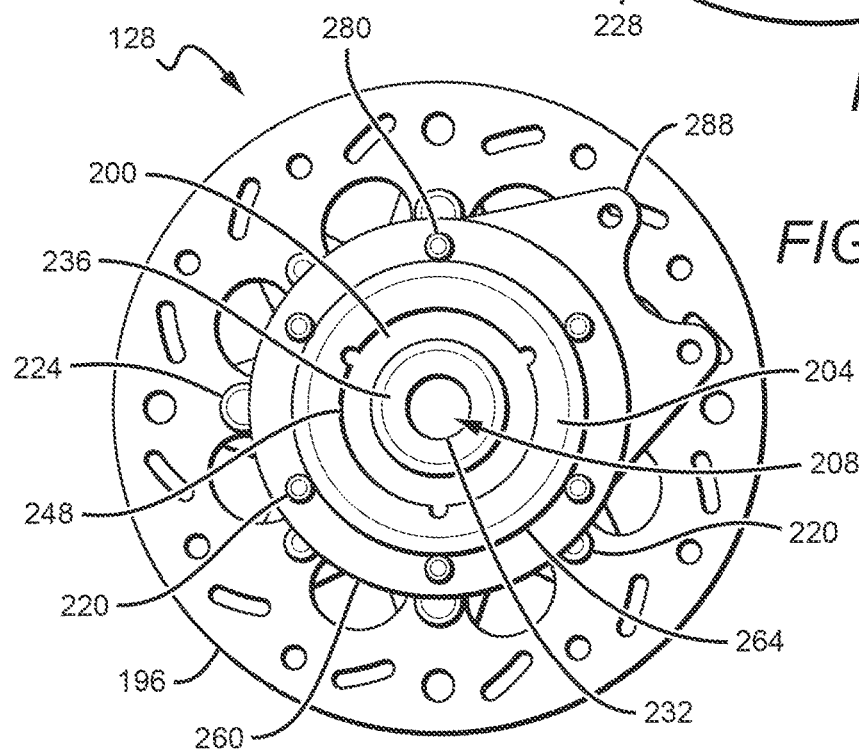
FIG. 6C

_

UNIVERSAL AXLE-HUB ASSEMBLY

PRIORITY

This application is a continuation of U.S. patent application Ser. No. 16/454,516 filed on Jun. 27, 2019 and U.S. patent application Ser. No. 15/625,728, filed Jun. 16, 2017, now issued as U.S. Pat. No. 10,343,716, which claims the benefit of and priority to U.S. Provisional Application No. 62/480,960, filed Apr. 3, 2017, both of which are incorporated herein by reference in their entirety.

FIELD

The field of the present disclosure generally relates to vehicle suspension systems. More particularly, the field of the invention relates to a universal axle-hub assembly for an off-road vehicle configured to improve assembly, servicing, and repairing of an off-road drivetrain of the vehicle.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A universal axle-hub assembly is provided for an off-road vehicle. The universal axle-hub assembly comprises a wheel hub that is configured to receive a constant velocity (CV) axle snout into an opening extending through an axle support of the wheel hub. An outboard-most portion of the opening is comprised of a splined portion that engages with similar splines disposed on an outboard-most portion of the CV axle snout. An inboard-most portion of the opening is comprised of a smooth portion that receives a smooth portion of the CV axle snout. The axle support extends through an entirety or more of the width of a bearing configured to support the wheel hub, such that the bearing supports the smooth portion of the CV axle snout and substantially eliminates shear forces acting on the splined portion of the CV axle snout. A bearing carrier is configured to support the bearing and be fastened onto a trailing arm or a spindle of the off-road vehicle. A brake disc is configured to be fastened onto the wheel hub.

In an exemplary embodiment, an axle-hub assembly for an off-road vehicle comprises a wheel hub configured to be coupled with a wheel of the off-road vehicle and comprising an axle support configured to receive a constant velocity (CV) axle snout; a bearing comprising an inner race that receives and supports the axle support; a bearing carrier comprising an opening that supports an outer race of the bearing, the bearing carrier being configured to be fastened onto a trailing arm or a spindle of the off-road vehicle; and a brake disc that is fastened onto the wheel hub and configured to slidably receive brake shoes disposed within a brake caliper of the off-road vehicle.

In another exemplary embodiment, the wheel hub includes a plurality of holes comprised of an even number of threaded holes and an even number of relatively larger smooth holes that are alternatingly distributed on the periphery of the wheel hub, the threaded holes being configured to receive threaded fasteners to fastening the brake disc onto the wheel hub, the smooth holes being configured to receive wheel studs, such that a threaded portion of each of the wheel studs extends beyond the wheel hub. In another exemplary embodiment, the wheel studs are forcibly inserted into the smooth holes, the threaded portions being configured to receive lug nuts for the purpose of fastening the wheel onto the wheel hub.

In another exemplary embodiment, the axle support comprises a cylindrical portion of the wheel hub and an opening concentrically disposed within the cylindrical portion that extends through an entirety of the wheel hub and is configured to receive the CV axle snout. In another exemplary embodiment, an outboard-most portion of the opening is comprised of a splined portion that is configured to engage with similar splines disposed on an outboard-most portion of the CV axle snout, and wherein an inboard-most portion of the opening is comprised of a smooth portion that is configured to receive a smooth portion of the CV axle snout. In another exemplary embodiment, the splined portion is configured to lock the wheel hub into rotational engagement with the splined portion of the CV axle snout, such that torque may be conducted by way of a drive axle to the wheel. In another exemplary embodiment, the smooth portion supports the smooth portion of the CV axle snout, such that the splined portion of the CV axle snout is substantially free of shear forces. In another exemplary embodiment, the axle support extends through an entirety or more of the width of the bearing, such that the bearing supports a smooth portion of the CV axle snout and substantially eliminates shear forces acting on a splined portion of the CV axle snout, thereby substantially eliminating a potential wheel loss from the off-road vehicle.

In another exemplary embodiment, the axle support comprises an exterior diameter that is suitably sized to engage with the inner race of the bearing, such that the bearing supports the wheel hub in a rotating relationship with respect to the bearing carrier supporting the outer race of the bearing. In another exemplary embodiment, the bearing is retained in the bearing carrier by way of a retaining ring disposed within a groove at a first side of the outer race and a ridge disposed in the opening at a second side of the outer race.

In another exemplary embodiment, the bearing carrier is comprised of a flange and a lip that are concentric with the opening that supports the outer race of the bearing, the flange being configured to be engaged with a mating surface disposed on any of the trailing arms and spindles of the off-road vehicle, and the lip being configured to slidably engage within an interior surface of an opening that is concentric with the mating surface. In another exemplary embodiment, the flange comprises a plurality of holes that are configured to allow inserting a plurality of threaded fasteners through the plurality of holes into a plurality of threaded holes disposed in the mating surface for fixating the flange to the mating surface. In another exemplary embodiment, the lip is configured to align the flange with the mating surface, such that the plurality of holes in the flange may be aligned with the plurality of threaded holes disposed in the mating surface. In another exemplary embodiment, the flange includes a thinner portion configured to accommodate coupling a brake caliper bracket with the bearing carrier, the brake caliper bracket being configured to receive a brake caliper such that brake shoes within the brake caliper may be engaged with the brake disc for the purpose of slowing rotation of the wheel hub. In another exemplary embodiment, three or more of the plurality of threaded fasteners may be inserted through holes in the brake caliper bracket and the plurality of holes, and then engaged with the plurality of threaded holes.

In an exemplary embodiment, an axle-hub assembly for an off-road vehicle comprises a wheel hub configured to receive a constant velocity (CV) axle snout; a bearing configured to support the wheel hub; a bearing carrier configured to support the bearing and be fastened onto a trailing arm or a spindle of the off-road vehicle; and a brake disc configured to be fastened onto the wheel hub.

In another exemplary embodiment, an axle support comprising a cylindrical portion of the wheel hub is configured to receive the CV axle snout. In another exemplary embodiment, the axle support extends through an entirety or more of the width of the bearing, such that the bearing supports a smooth portion of the CV axle snout and substantially eliminates shear forces acting on a splined portion of the CV axle snout, thereby substantially eliminating a potential wheel loss from the off-road vehicle. In another exemplary embodiment, an outboard-most portion of an opening extending through the axle support is comprised of a splined portion that engages with similar splines disposed on an outboard-most portion of the CV axle snout, and wherein an inboard-most portion of the opening is comprised of a smooth portion that receives a smooth portion of the CV axle snout. In another exemplary embodiment, the splined portion is configured to lock the wheel hub into rotational engagement with the splined portion of the CV axle snout, such that torque may be conducted by way of a drive axle to the wheel, and wherein the smooth portion supports the smooth portion of the CV axle snout, such that the splined portion of the CV axle snout is substantially free of shear forces.

BRIEF DESCRIPTION OF THE DRAWINGS

The drawings refer to embodiments of the present disclosure in which:

FIG. 6A illustrates a side plan view of the exemplary embodiment of the universal axle-hub assembly of FIG. 5A;

FIG. 6B illustrates a front plan view of the exemplary embodiment of the universal axle-hub assembly of FIG. 6A;

FIG. 6C illustrates a rear plan view of the exemplary embodiment of the universal axle-hub assembly of FIG. 6B;

Figure 1:
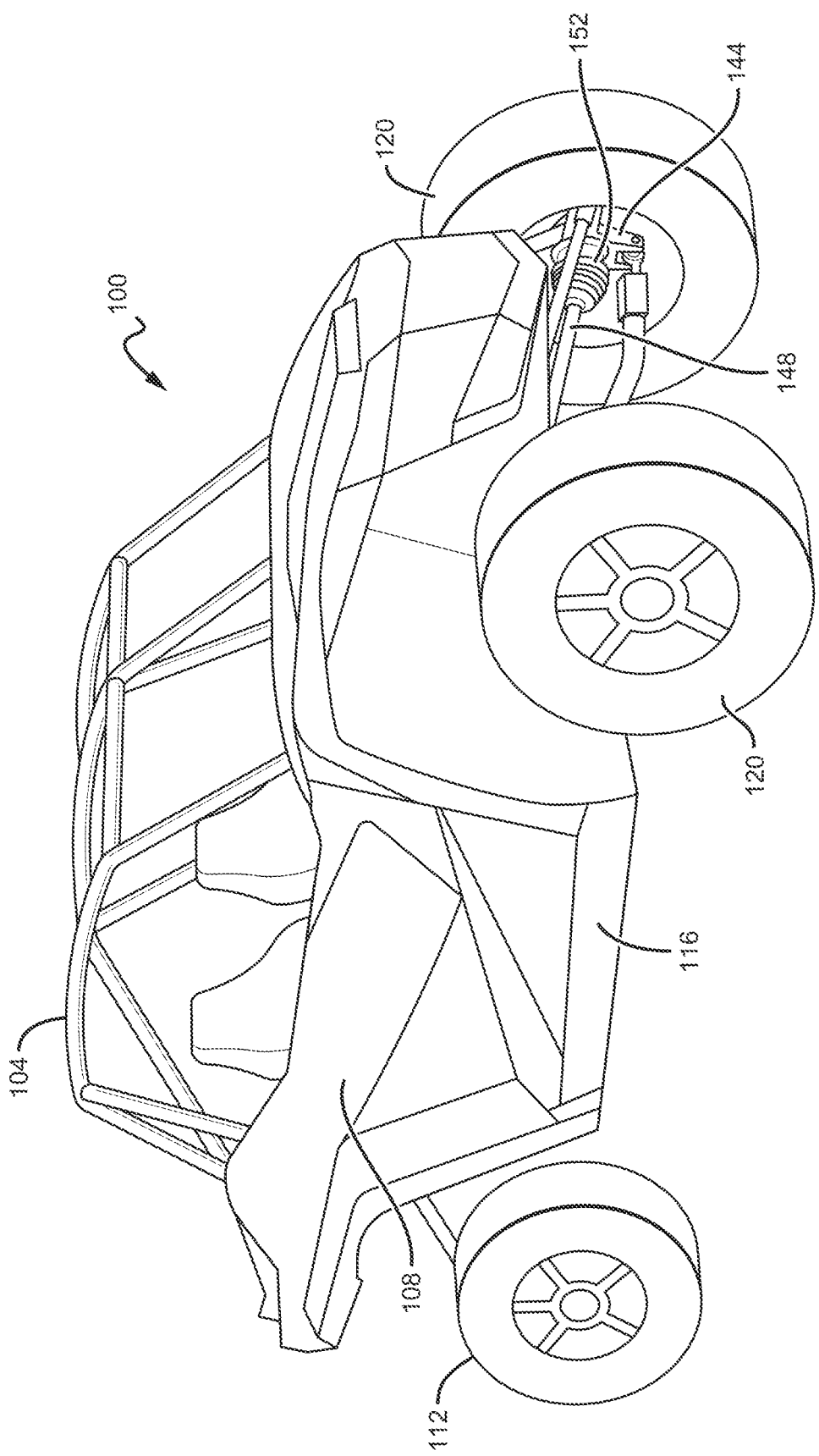
FIG. 1 illustrates an exemplary embodiment of an off-road vehicle that is particularly suitable for implementation of a universal axle-hub assembly in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a universal axle-hub assembly for an off-road vehicle. The universal axle-hub assembly comprises a wheel hub configured to be coupled with a wheel of the off-road vehicle and includes an axle support configured to receive a constant velocity (CV) axle snout. A bearing comprises an inner race that receives and supports the axle support. The axle support extends through an entirety or more of the width of the bearing, such that the bearing supports a smooth portion of the CV axle snout and substantially eliminates shear forces acting on a splined portion of the CV axle snout. A bearing carrier comprises an opening that supports an outer race of the bearing. The bearing is retained in the bearing carrier by way of a retaining ring disposed within a groove at a first side of the outer race and a ridge disposed in the opening at a second side of the outer race. The bearing carrier is configured to be fastened onto a trailing arm or a spindle of the off-road vehicle. A brake disc is configured to be fastened onto the wheel hub and slidably receive brake shoes disposed within a brake caliper of the off-road vehicle.

FIG. 1 shows an off-road vehicle 100 that is particularly suitable for implementation of a universal axle-hub assembly in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system.

Figure 2:
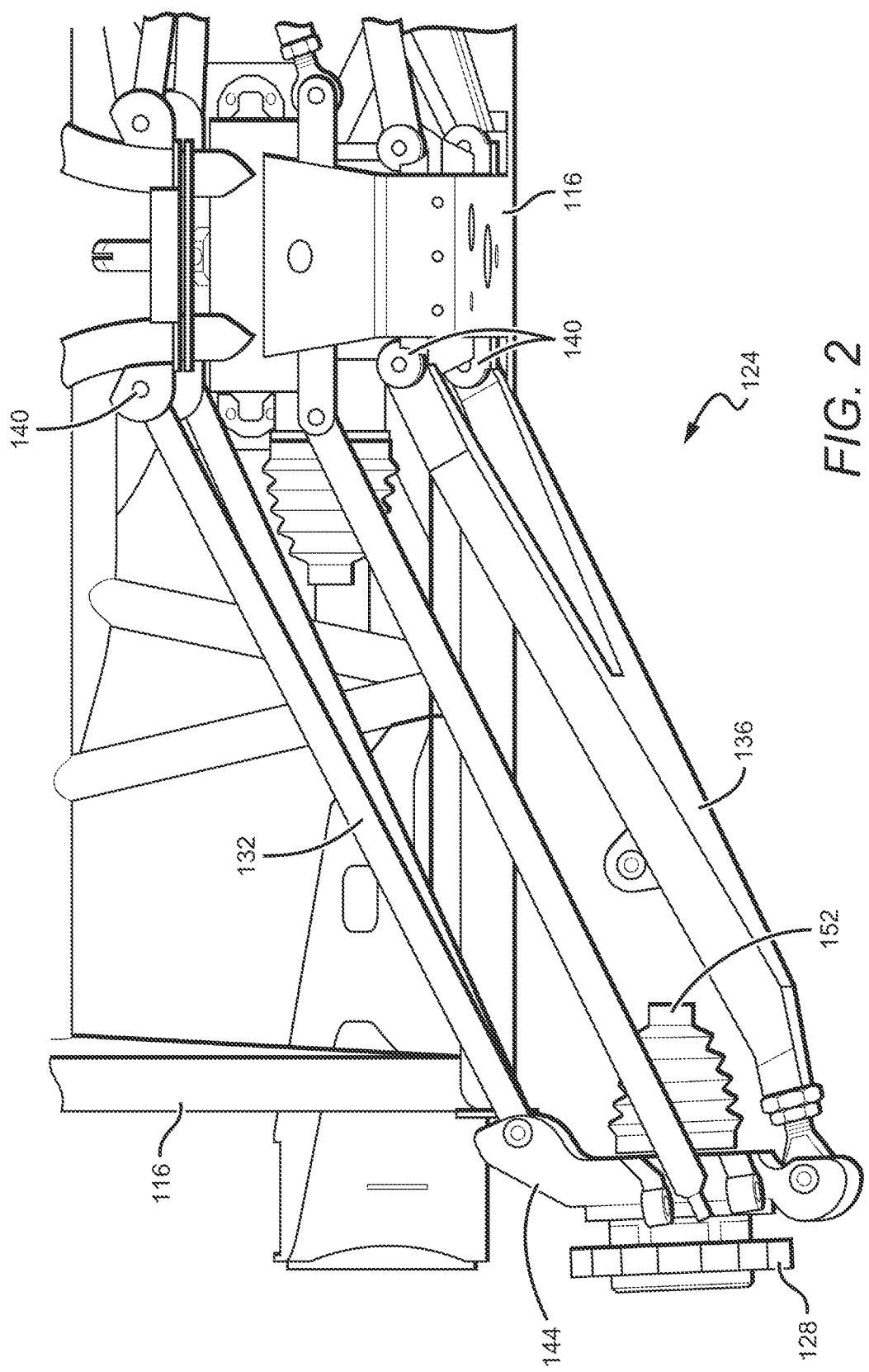
FIG. 2 illustrates a front view of a front suspension system comprising a universal axle-hub assembly that is configured to couple a front wheel with a passenger side of an off-road vehicle.

FIG. 2 illustrates a front view of a front suspension system 124 comprising a universal axle-hub assembly 128 that is configured to couple the front wheel 120 with a passenger side of the off-road vehicle 100. The front suspension system 124 is comprised of an upper suspension arm 132 and a lower suspension arm 136 that couple the front wheel 120 with the chassis 116. Each of the upper and lower suspension arms 132, 136 comprises two inboard mounting joints 140 to the chassis 116 and one outboard mounting joint to a spindle assembly 144. As will be recognized, the upper and lower suspension arms 132, 136 generally are of a double wishbone variety of suspension that facilitates controlling various parameters affecting the orientation of the wheel 120 with respect to the off-road vehicle 100, such as, by way of non-limiting example, camber angle, caster angle, toe pattern, roll center height, scrub radius, and scrub.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantially identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100.

As best shown in FIGS. 1-2, a drive axle 148 is coupled between a transaxle and the front wheel 120. The drive axle 148 is configured to conduct torque from the transaxle to the front wheel 120 and accommodate vertical pivoting motion of the front suspension assembly 124 in response to road conditions. The drive axle 148 is engaged with a constant velocity (CV) joint 152 that is coupled with the universal axle-hub assembly 128 onto which the front wheel 120 may be mounted. The CV joint 152 allows uninterrupted torque transmission from the transaxle to the front wheel 120 during vertical pivoting of the front suspension assembly 124 due to road conditions. The spindle assembly 140 generally supports the universal axle-hub assembly 128, the CV joint 152, and the front wheel 120 by way of one or more roller bearings, as described herein.

Figure 3:
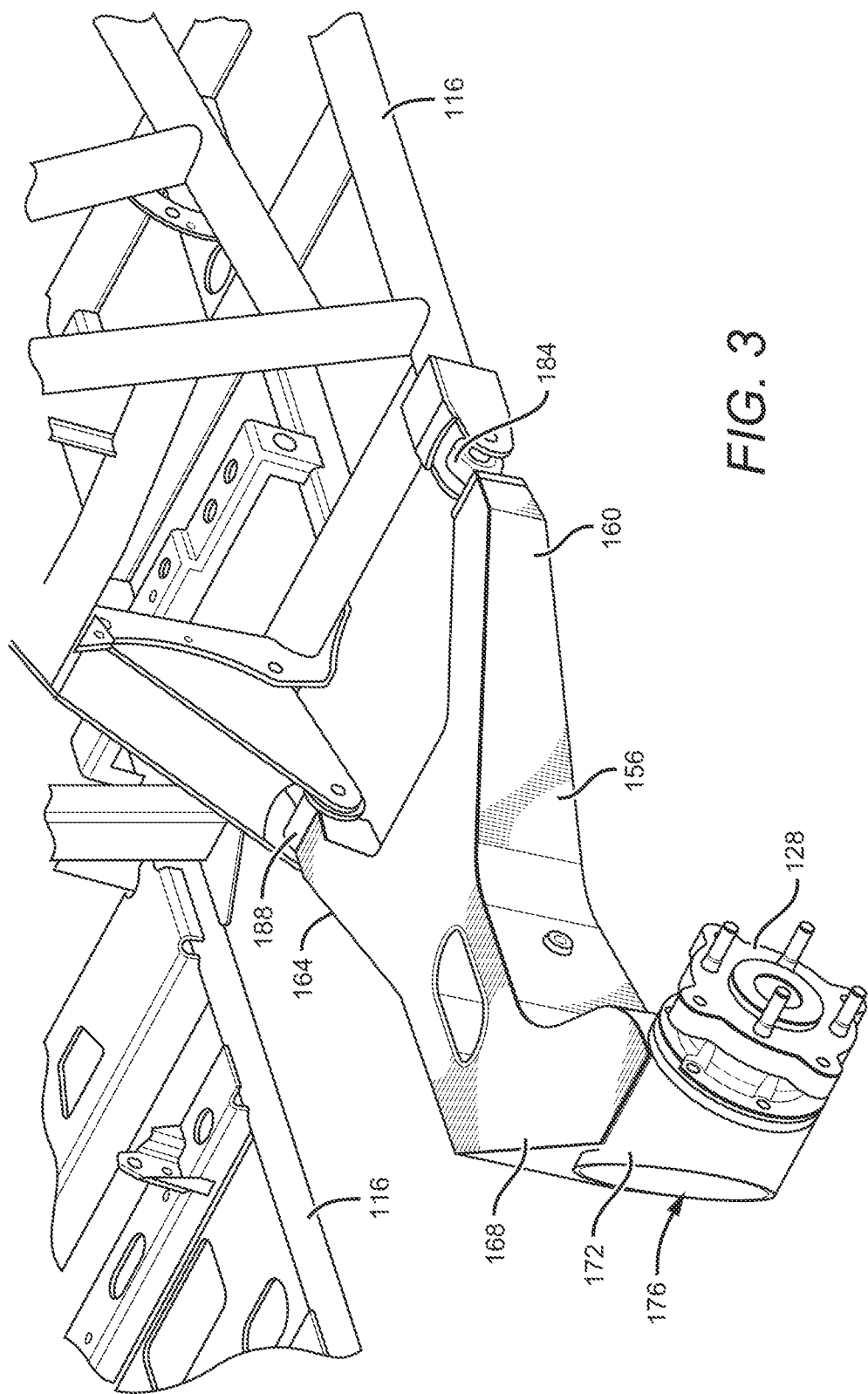
FIG. 3 illustrates an isometric view of a wishbone trailing arm comprising a universal axle-hub assembly that is configured to couple a rear wheel with a passenger side of an off-road vehicle.

FIG. 3 illustrates a wishbone trailing arm 156 comprising a universal axle-hub assembly 128 that is configured to couple a rear wheel 112 to the chassis 116, according to the present disclosure. As will be recognized by those skilled in the art, the universal axle-hub assembly 128 generally is rotatably coupled with the wishbone trailing arm 156 by way of one or more suitably sized roller bearings. Further, the rear wheel 112 and the universal axle-hub assembly 128 generally are driven by way of a constant velocity (CV) joint 152 configured to convey torque from an engine of the vehicle.

Figure 4:
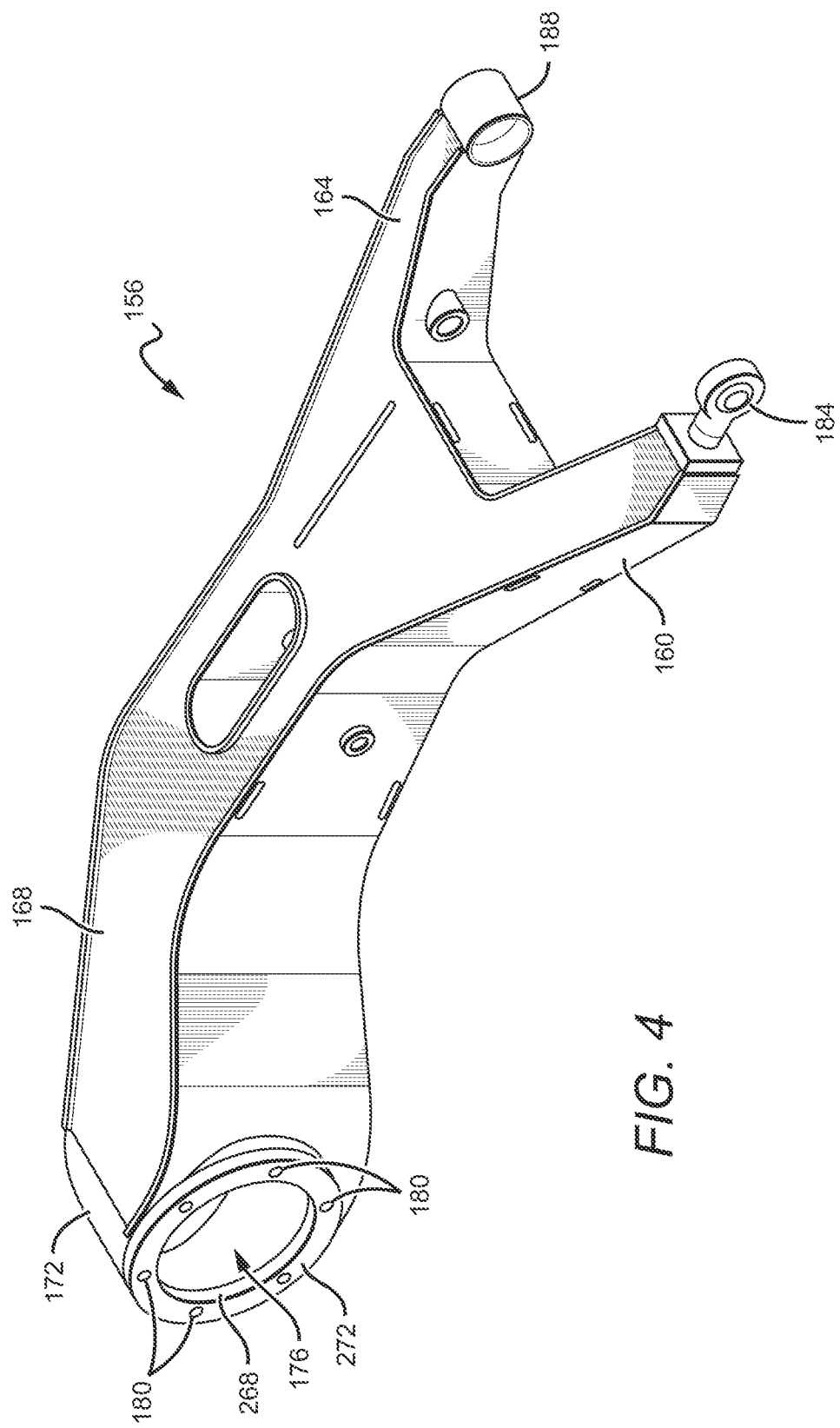
FIG. 4 illustrates an isometric view of the wishbone trailing arm of FIG. 3 showing an opening configured to receive a universal axle-hub assembly.

As best illustrated in FIGS. 3-4, the wishbone trailing arm 156 is comprised of a first swing arm 160 and a second swing arm 164 extending forwardly from a joined swing arm 168. A rear-most end of the joined swing arm 168 comprises a cylindrical axle support 172 configured to couple the universal axle-hub assembly 128 with the wishbone trailing arm 156. As shown in FIG. 4, the cylindrical axle support 172 comprises an opening 176 that is configured to receive and support the universal axle-hub assembly 128. A multiplicity of threaded holes 180 facilitate fastening the universal axle-hub assembly 128 onto the wishbone trailing arm 156 by way of suitably sized bolts, as described herein. An inboard portion of the opening 176 is configured to receive the CV joint 152, such that the CV joint may be fastened to the universal axle-hub assembly 128 so as to place the axle-hub assembly into rotational communication with the engine. As will be appreciated, the cylindrical axle support 132 may further serve as a rigid shield to protect the CV joint 152 from damage due to flying rocks and road debris encountered during off-road driving.

As shown in FIG. 3, the wishbone trailing arm 156 may be coupled with the chassis 116 by way of a first chassis mount 184 and a second chassis mount 188. The first chassis mount 184 couples the first swing arm 160 to the chassis 116 and operates as a pivot that places the wishbone trailing arm 156 into a hinged relationship with the chassis. The second chassis mount 188 couples the second swing arm 164 to the chassis 116 and operates as a pivot that allows the wishbone trailing arm 156 to hingedly rotate relative to the chassis 116. Thus, the first and second chassis mounts 184, 188 allow the rear wheel 112 to undergo a substantially vertical motion according to the terrain over which the wheel is rolling while diminishing a transfer of the vertical motion to the vehicle.

FIGS. 5A-7C illustrate several views of an exemplary embodiment of the universal axle-hub assembly 128 that may be used in conjunction with the spindle 144 and the wishbone trailing arm 156, as described herein. Although the above described opening 176 and threaded holes 180 that receive the universal axle-hub assembly 128 have been discussed with respect to the wishbone trailing arm 156, it should be understood that the spindle 144 comprises a substantially identical opening 176 and threaded holes 180, such that the universal axle-hub assembly 128 may be equivalently fastened onto the spindle 140. Moreover, it should be recognized that although the passenger-side of the off-road vehicle 100 is specifically discussed herein, the spindle 144 and the wishbone trailing arm 156 disposed on the driver side of the vehicle 100 are comprised of openings 176 and threaded holes 180 that are configured to receive the universal axle-hub assembly 128. Therefore, it is to be understood that the universal axle-hub assembly 128 may be equivalently installed or fastened onto any of the spindles 140 and wishbone trailing arms 156 disposed on the driver side and the passenger side of the off-road vehicle 100, without limitation.

Figure 5A:
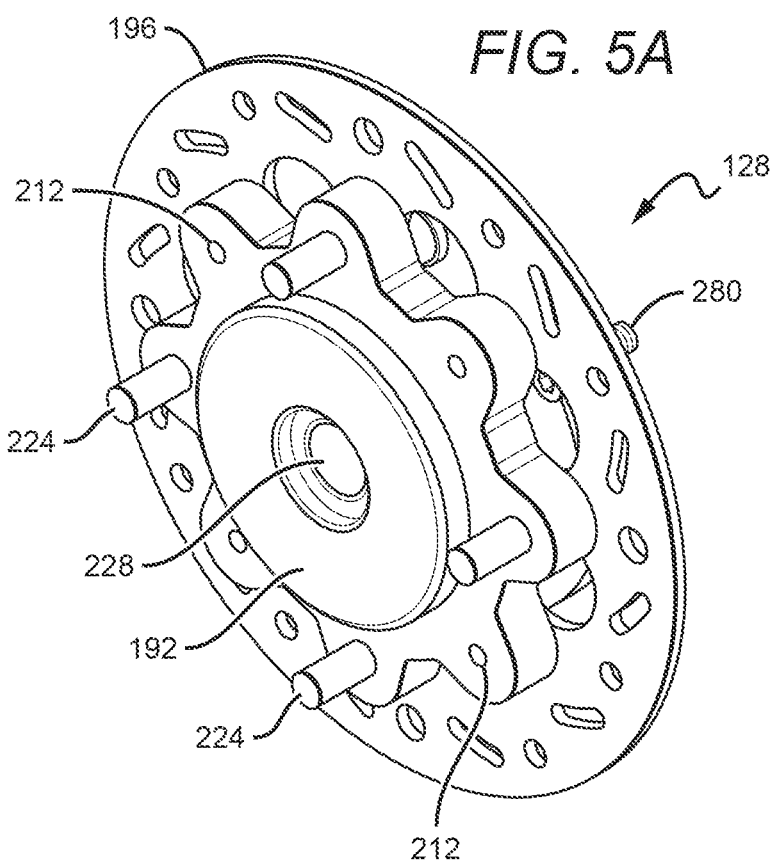
FIG. 5A illustrates a front isometric view of an exemplary embodiment of a universal axle-hub assembly.
Figure 5B:
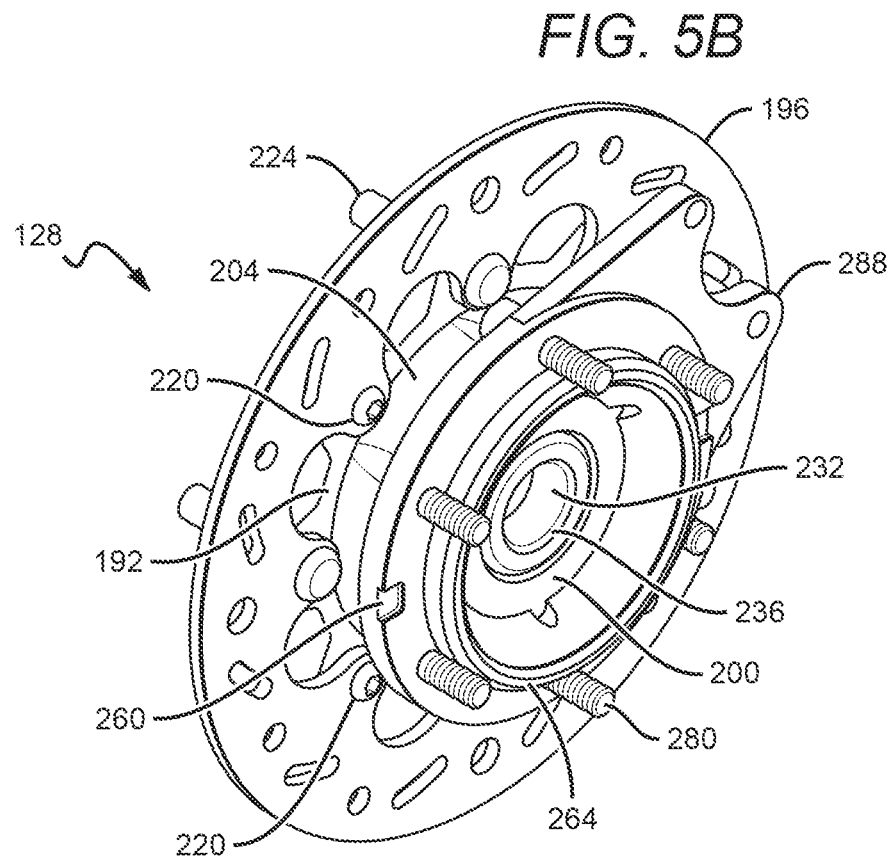
FIG. 5B illustrates a rear isometric view of the exemplary embodiment of the universal axle-hub assembly of FIG. 5A.
Figure 7A:
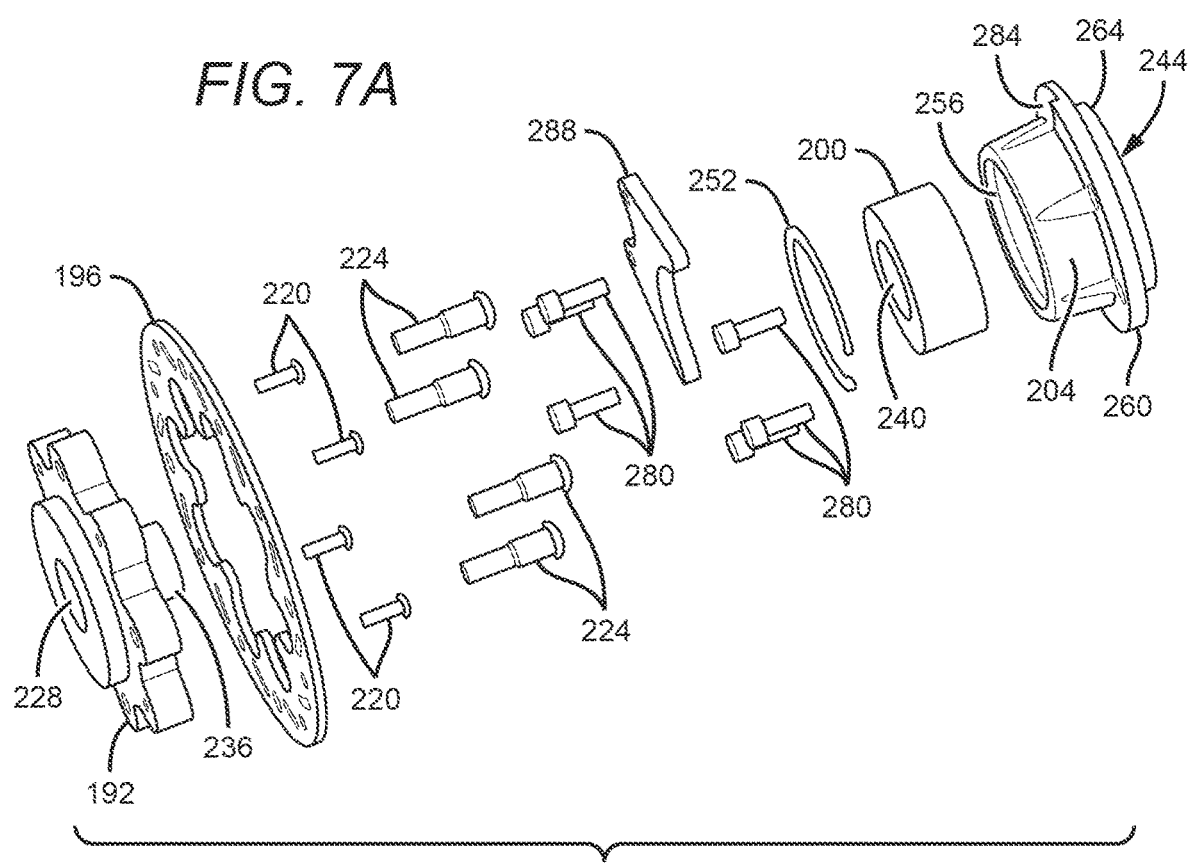
FIG. 7A illustrates a front exploded view of the exemplary embodiment of the universal axle-hub assembly of FIG. 5A.
Figure 7B:
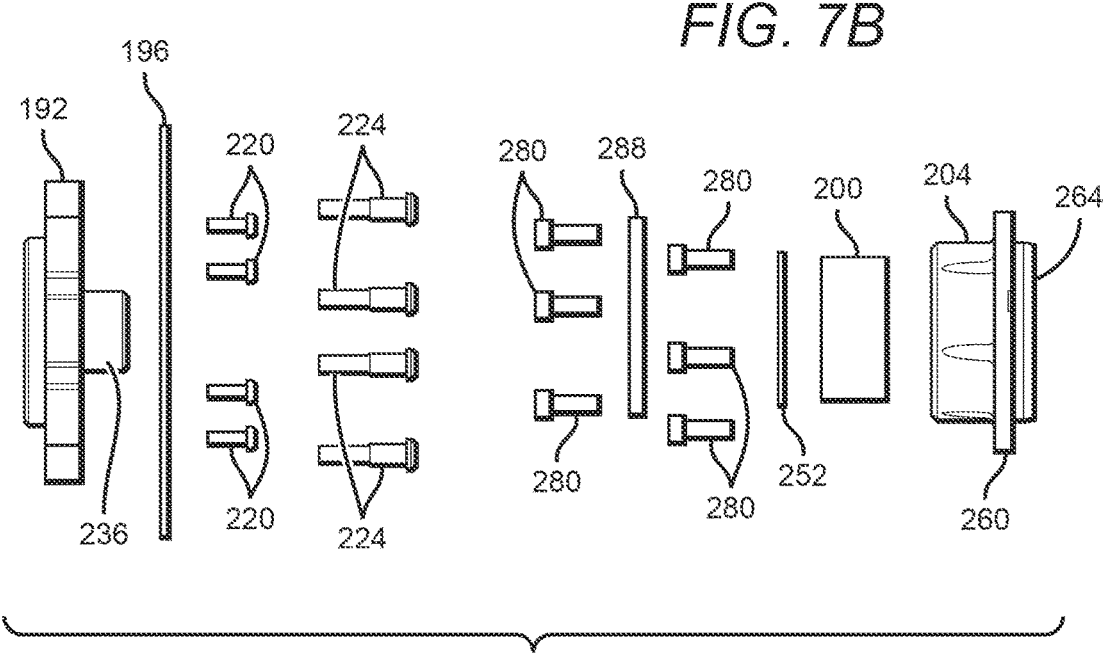
FIG. 7B illustrates a side exploded view of the exemplary embodiment of the universal axle-hub assembly of FIG. 7A.
Figure 7C:
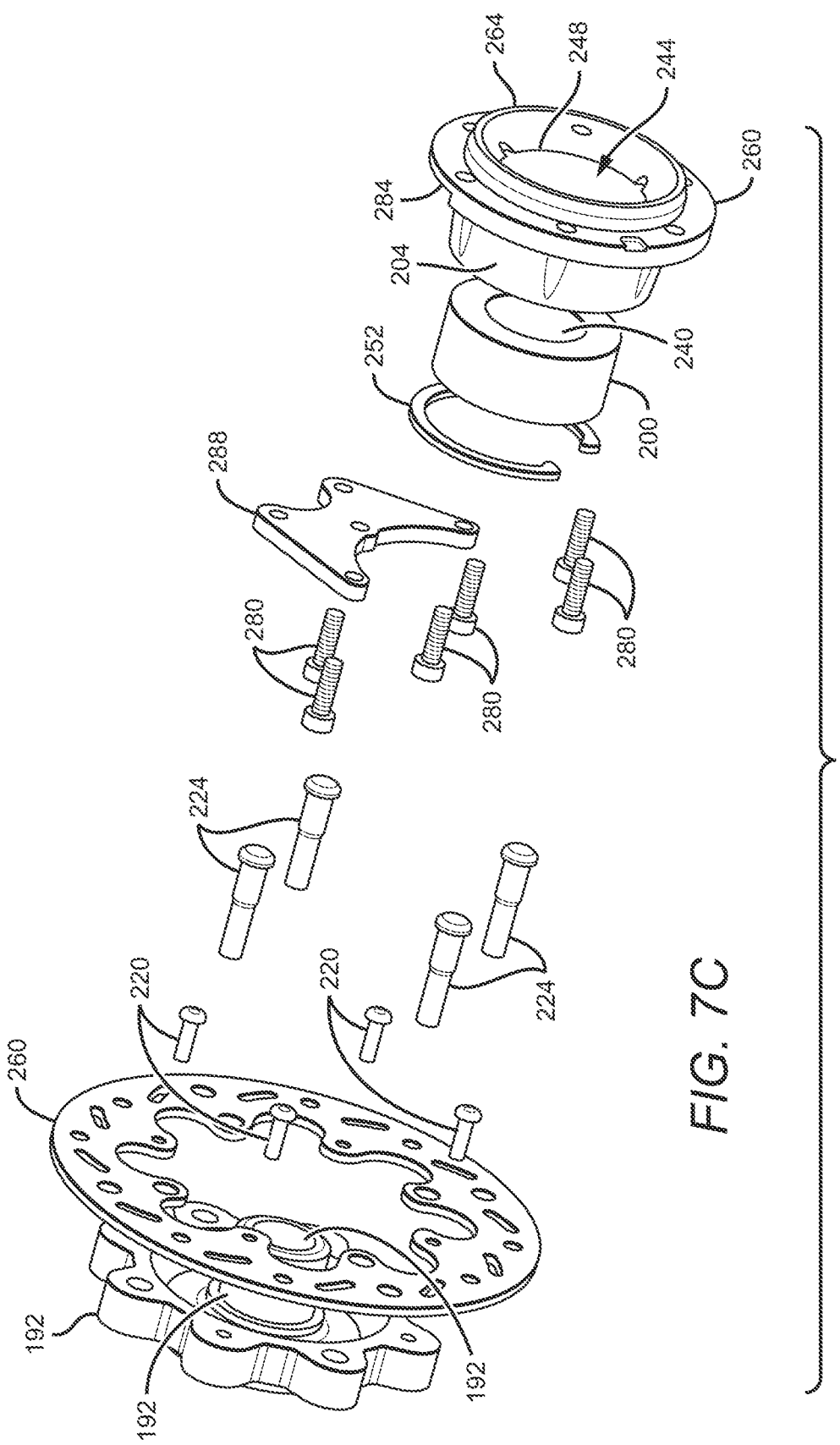
FIG. 7C illustrates a rear exploded view of the exemplary embodiment of the universal axle-hub assembly of FIG. 7B.

FIGS. 5A-5B illustrate respective front and rear isometric views of the universal axle-hub assembly 128. FIGS. 6A-6C illustrate respective side, front, and rear plan views of the universal axle-hub assembly 128. FIGS. 7A-7C illustrate respective front, side, and rear exploded views of the universal axle-hub assembly 128. As particularly well shown in FIGS. 7A-7C, the universal axle-hub assembly 128 is broadly comprised of a wheel hub 192, a brake disc 196, a bearing 200, and a bearing carrier 204.

The wheel hub 192 is a generally circular member that is configured to be coupled with a wheel, such as any of the wheels 112, 120 discussed hereinabove. As best shown in FIG. 6B, the wheel hub includes a centrally disposed opening 208 and a plurality of holes that are uniformly disposed around the periphery. In the illustrated embodiment, the plurality of holes is comprised of an even number of threaded holes 212 and an even number of relatively larger smooth holes 216 that are alternatingly distributed on the periphery of the wheel hub 192. The threaded holes 212 are configured to threadably receive threaded fasteners 220 to facilitate fastening the brake disc 196 onto the wheel hub 192, as shown in FIG. 5B. The threaded fasteners 220 may be tightly engaged within the threaded holes 212 by way of a suitable tool for driving the fasteners. The smooth holes 216 are configured to receive wheel studs 224, such that a threaded portion of the wheel studs extends beyond the wheel hub, as shown in FIG. 5A. As will be appreciated, the wheel studs 224 are generally configured to receive lug nuts for the purpose of fastening the wheel onto the wheel hub 192. It is contemplated that the wheel studs 224 may be forcibly inserted into the smooth holes 216, such as by way of a press fitment.

As best shown in FIG. 6B-6C, the opening 208 extends through an entirety of the wheel hub 192 and is configured to receive a CV axle snout (not shown) that is coupled with the CV joint 152. An outboard-most portion of the opening 208, shown in FIG. 5A, is comprised of a splined portion 228 that is configured to engage with similar splines disposed on the outboard-most portion of the CV axle snout. As shown in FIG. 5B, an inboard-most portion of the opening 208 is comprised of a smooth portion 232 that is configured to receive a smooth portion of the CV axle snout. As will be appreciated, the splined portion 228 locks the wheel hub 192 into rotational engagement with the splined portion of the CV axle snout, such that torque may be conducted by way of the drive axle 148 to the wheel coupled with the wheel hub. The smooth portion 232 serves to support the smooth portion of the CV axle snout, such that the splined portion of the CV axle snout is substantially free of any shear forces. Unlike conventional wheel hubs, therefore, only driving forces are applied to the splined portions of the wheel hub 192 and the CV axle snout.

As shown in FIGS. 7A-7C, the smooth portion 232 of the opening 208 is concentrically disposed within a cylindrical portion of the wheel hub 192 comprising an axle support 236 that extends in an inboard direction through an opening 240 of the bearing 200. As will be appreciated, the bearing 200 may be of a roller-bearing variety that is comprised of an inner race and an outer race, wherein the inner race may be rotated with respect to the outer race. Thus, in the illustrated embodiment, the axle support 236 may comprise an exterior diameter that is suitably sized to engage with the inner race of the bearing 200. Further, the bearing 200 may have an exterior diameter that is suitably sized, such that the outer race of the bearing 200 may be received within a cylindrical opening 244 in the bearing carrier 204. The bearing 200 may be retained in the bearing carrier 204 by way of a ridge 248 disposed in the opening 244 and a retaining ring 252. As shown in FIG. 7A, the retaining ring 252 may be inserted into a groove 256 disposed in the opening 244. As will be appreciated, therefore, the bearing 200 enables the wheel hub 192 to rotate freely with respect to the bearing carrier 204.

As best shown in FIGS. 5B and 6C, the axle support 236 preferably extends through an entirety or more of the width of the bearing 200. Experimental observation has demonstrated that conventional axle supports that are relatively shorter than the axle support 236 allow shear forces to be exerted onto the splined portion of the CV axle snout and onto an axle nut that affixes the CV axle snout to the wheel hub. These shear forces have been observed to cause accelerated wear and damage to the CV axle snout and the wheel hub. In many instances, the accelerated wearing of the CV axle snout and the wheel hub have given rise to a shearing of the axle snout altogether, thereby allowing the wheel to separate from the off-road vehicle. Experimentation has shown that extending the axle support 236 entirely through the inner race of the bearing 200, as described hereinabove, advantageously eliminates any shear forces acting on the splined portion 228 of the opening 208. With the smooth portion 232 of the opening 208 and the bearing 200 supporting the smooth portion of the CV axle snout, only driving forces are applied to the splined portions of the wheel hub 192 and the CV axle snout. Thus, the herein disclosed relationship between the axle support 236 and the bearing 200, best shown in FIGS. 5B and 6C, substantially eliminates potential wheel loss from the off-road vehicle 100.

The bearing carrier 204 generally is configured to be received by, and fastened into, the opening 176 of any of the spindles 144 and wishbone trailing arms 156, as described herein. The bearing carrier 204 is a generally cylindrically-shaped member configured to retain the bearing 200, as described above, and is comprised of a flange 260 and a lip 264 that are concentric with the opening 244. The lip 264 is configured to slidably engage within an interior surface 268 of the opening 176, and thus the lip may aid with installing the bearing carrier 204 into the opening 176. The lip 264 may further align the flange 260 with a mating surface 272 surrounding the opening 176, such that holes 276 in the flange 260 may be aligned with the threaded holes 180 surrounding the opening 176. As best shown in FIG. 6A, the holes 276 are configured to allow threaded fasteners 280 to be inserted through the flange 260 and engaged with the threaded holes 180 for the purpose of fixating the flange 260 to the mating surface 272. In the illustrated embodiment, the holes 276 are countersunk to provide clearance between the brake disc 196 and head portions of the threaded fasteners 280.

As best illustrated in FIGS. 7A and 7C, the flange 260 may include a thinner portion 284 to accommodate coupling a brake caliper bracket 288 with the bearing carrier 204. In the embodiment illustrated herein, three of the threaded fasteners 280 may be inserted through holes in the brake caliper bracket 288 and the holes 276, and then engaged with the threaded holes 180. tightening the threaded fasteners 280 within the threaded holes 180 fixates the brake caliper bracket 288 and the bearing carrier 204 within the opening 176. As will be appreciated by those skilled in the art, coupling the brake caliper bracket 288 with the bearing carrier 204 facilitates mounting a brake caliper onto the universal axle-hub assembly 128, such that brake shoes within the brake caliper may be engaged with the brake disc 196 for the purpose of slowing rotation of the wheel hub 192 during operation of the off-road vehicle 100.

As will be recognized, the embodiments of the bearing carrier 204, the brake caliper bracket 288, and the spindles 144, as well as the wishbone trailing arms 156, described herein generally are comprised of separate components that may be coupled together. Thus, each of the spindles 144 and the wishbone trailing arms 156 may be comprised of a three-piece configuration that includes the bearing carrier 204 and the brake caliper bracket 188. In some embodiments, however, the bearing carrier 204 may be cast or forged into the spindle 144 or the wishbone trailing arm 156. Further, the brake caliper bracket 288 may be cast or forged into the spindle 144 or the wishbone trailing arm 156. For example, in some embodiments, the spindle 144 may be comprised of a one-piece configuration wherein the bearing carrier 204 and the brake caliper bracket 288 are forged as portions of the spindle. In some embodiments, however, the spindle 144 may be a two-piece configuration in which either one of the bearing barrier 204 or the brake caliper bracket 288 may be forged as a portion of the spindle. Moreover, it should be understood that the wishbone tailing arms 156 may each be either of a one-piece, a two-piece, or a three-piece configuration that comprises the bearing carrier 204 and the brake caliper bracket 288, without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An axle-hub assembly for an off-road vehicle, the assembly comprising:
   a wheel hub including an axle support for receiving an axle snout;
   a bearing for supporting the wheel hub;
   a bearing carrier for coupling the wheel hub with either a trailing arm or a front spindle;
   a brake disc fastened onto the wheel hub; and
   a brake caliper bracket fastened to the bearing carrier for supporting a brake caliper.

2. The assembly of claim 1, wherein the axle support comprises a cylindrical portion of the wheel hub that is configured to receive an inner race of the bearing.

3. The assembly of claim 2, wherein the axle support is configured to cause the bearing to support a smooth portion of the axle snout so as to substantially eliminate shear forces acting on splines of the axle snout.

4. The assembly of claim 3, wherein the wheel hub includes a splined portion that is outboard of the axle support and is configured to engage with the splines of the axle snout.

5. The assembly of claim 1, wherein the bearing carrier is a cylindrical member comprising an opening configured to retain the bearing.

6. The assembly of claim 5, wherein the bearing carrier supports an outer race of the bearing between an inboard ridge and a retaining ring disposed within an outboard groove.

7. The assembly of claim 5, wherein the bearing carrier includes an inboard flange and a lip that are configured to engage with a mating surface disposed on any of the trailing arms and front spindles of the off-road vehicle.

8. The assembly of claim 7, wherein the flange includes a plurality of holes for engaging fasteners with a plurality of threaded holes disposed in the mating surface for fastening the bearing carrier to the mating surface.

9. The assembly of claim 7, wherein the flange is configured to accommodate coupling the brake caliper bracket with the bearing carrier.

10. The assembly of claim 9, wherein the flange is configured to position the brake caliper bracket such that the brake caliper may engage brake shoes with the brake disc.

11. An axle-hub assembly for an off-road vehicle, the assembly comprising:
    a cylindrical axle support comprising a trailing arm or a front spindle of the vehicle, the cylindrical axle support configured to provide a rigid shield to a constant velocity joint coupled with the axle-hub assembly;
    a bearing carrier for coupling a wheel hub with the cylindrical axle support;
    a bearing for supporting the wheel hub;
    an axle support comprising the wheel hub for receiving an axle snout;
    a brake disc fastened onto the wheel hub; and
    a brake caliper bracket fastened to the bearing carrier for supporting a brake caliper.

12. The assembly of claim 11, wherein the cylindrical axle support is configured to protect the constant velocity joint from damage due to rocks and road debris during operating the vehicle.

13. The assembly of claim 11, wherein the mating surface includes a plurality of threaded holes for receiving fasteners for fastening the bearing carrier to the mating surface.

14. The assembly of claim 13, wherein the bearing carrier includes an inboard flange and a lip that are configured to engage with the mating surface.

15. The assembly of claim 14, wherein the flange includes a plurality of smooth holes for allowing the fasteners to engage with the plurality of threaded holes.

\* \* \* \* \*